United States Patent
Lacy et al.

(10) Patent No.: US 10,487,660 B2
(45) Date of Patent: Nov. 26, 2019

(54) ADDITIVELY MANUFACTURED BLADE EXTENSION WITH INTERNAL FEATURES

(71) Applicant: General Electric Company, Schenectady, NY (US)

(72) Inventors: Benjamin Paul Lacy, Greer, SC (US); Kassy Moy Hart, Greenville, SC (US); Xiuzhang James Zhang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 15/383,228

(22) Filed: Dec. 19, 2016

(65) Prior Publication Data

US 2018/0171802 A1    Jun. 21, 2018

(51) Int. Cl.
| | |
|---|---|
| *F01D 5/00* | (2006.01) |
| *F01D 5/02* | (2006.01) |
| *F01D 5/18* | (2006.01) |
| *F01D 5/30* | (2006.01) |
| *B22F 3/105* | (2006.01) |

(Continued)

(52) U.S. Cl.
CPC .............. *F01D 5/005* (2013.01); *B22F 3/105* (2013.01); *B22F 5/04* (2013.01); *F01D 5/025* (2013.01); *F01D 5/147* (2013.01); *F01D 5/18* (2013.01); *F01D 5/30* (2013.01); *F05D 2220/30* (2013.01); *F05D 2230/30* (2013.01); *F05D 2230/80* (2013.01); *F05D 2240/301* (2013.01);

(Continued)

(58) Field of Classification Search
CPC . F01D 5/005; F01D 5/147; F01D 5/18; F01D 5/30; F01D 5/025; B22F 3/105; B22F 5/04; Y02T 50/676; Y02T 50/671; F05D 2240/80; F05D 2240/60; F05D 2220/30; F05D 2240/301; F05D 2230/80; F05D 2230/30

See application file for complete search history.

(56) References Cited

U.S. PATENT DOCUMENTS

| | | |
|---|---|---|
| 6,461,108 B1 | 10/2002 | Lee et al. |
| 7,587,818 B2 | 9/2009 | Gorman et al. |

(Continued)

FOREIGN PATENT DOCUMENTS

| | | |
|---|---|---|
| EP | 2256297 A1 | 12/2010 |
| EP | 2942424 A2 | 11/2015 |

(Continued)

OTHER PUBLICATIONS

Extended European Search Report and Opinion issued in connection with corresponding EP Application No. 17206523.7 dated Jun. 11, 2018; pp. 8.

*Primary Examiner* — Jacob M Amick
*Assistant Examiner* — Charles Brauch
(74) *Attorney, Agent, or Firm* — Dale Davis; Hoffman Warnick LLC

(57) ABSTRACT

This disclosure provides components and methods for blade extensions with internal features. An airfoil extends from a root connector and includes an airfoil body defining at least one air channel enclosed within the airfoil body. The air channel extends to a build surface. An additive extension extends from the build surface of the airfoil body. The additive extension includes an additive structure extending the air channel from the build surface to an external surface of the additive extension.

8 Claims, 6 Drawing Sheets

(51) Int. Cl.
  *B22F 5/04*  (2006.01)
  *F01D 5/14*  (2006.01)

(52) U.S. Cl.
  CPC ...... *F05D 2240/60* (2013.01); *F05D 2240/80* (2013.01); *Y02T 50/671* (2013.01); *Y02T 50/676* (2013.01)

(56) References Cited

U.S. PATENT DOCUMENTS

| | | |
|---|---|---|
| 7,836,594 B2 | 11/2010 | Rose |
| 7,900,458 B2 | 3/2011 | James et al. |
| 8,444,376 B2 | 5/2013 | Krueckels et al. |
| 9,133,712 B2 | 9/2015 | Fisk et al. |
| 9,175,570 B2 | 11/2015 | Propheter-Hinckley et al. |
| 9,186,757 B2 | 11/2015 | Munshi et al. |
| 9,283,593 B2 | 3/2016 | Bruck et al. |
| 9,334,741 B2 | 5/2016 | Lee et al. |
| 2008/0182017 A1 | 7/2008 | Singh et al. |
| 2013/0209268 A1* | 8/2013 | Bregman ............ F01D 5/187 416/96 R |
| 2014/0010650 A1* | 1/2014 | Zelesky ............ F01D 5/18 416/1 |
| 2014/0255194 A1 | 9/2014 | Jones |
| 2015/0337664 A1* | 11/2015 | Cosi ............ F01D 5/141 415/208.1 |

FOREIGN PATENT DOCUMENTS

| | | | |
|---|---|---|---|
| EP | 2995410 A1 | 3/2016 | |
| EP | 3093087 A1 | 11/2016 | |
| GB | 1225926 A * | 3/1971 | ............ F01D 5/187 |
| WO | 2015042009 A1 | 3/2015 | |

\* cited by examiner

US 10,487,660 B2

ADDITIVELY MANUFACTURED BLADE EXTENSION WITH INTERNAL FEATURES

BACKGROUND OF THE INVENTION

The disclosure relates to additive components for airfoils and, more specifically, an additive component for extending internal airfoil features.

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include airfoil components for installation in a turbomachine such as an aircraft engine or power generation system, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials. Some additive manufacturing allows a component to be formed from a reserve of fine metal powder positioned on a build plate, which is processed by an electron beam or laser (using fusing heat treatments such as sintering or melting) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process.

Additive manufacturing opens opportunities for repair of existing components and/or creation of hybrid components where an additive component (or structure) is built on one or more surfaces of a pre-existing component without requiring separate attachment. For example, cast components may be used as a base component and additive features may be built on a cast and prepared build surface of the base component positioned in an additive manufacturing tool or modality.

BRIEF DESCRIPTION OF THE INVENTION

A first aspect of this disclosure provides a rotor blade with an additive extension of internal features. A root connector may engage a turbine shaft of a turbomachine. An airfoil extends from the root connector. The airfoil includes an airfoil body defining at least one air channel enclosed within the airfoil body and extending to a build surface. An additive extension extends from the build surface of the airfoil body. The additive extension includes an additive structure further defining the at least one air channel extending from the build surface to an external surface of the additive extension.

A second aspect of the disclosure provides a method for additive manufacturing of an additive extension with internal features. An airfoil body of a rotor blade is positioned in a build plate. The airfoil body has at least one build surface and at least one air channel within the airfoil body extending to the at least one build surface. An additive structure is additively manufactured on the at least one build surface. The additive structure defines an additive extension to the airfoil body and further defines the at least one air channel extending from the at least one build surface to an external surface of the additive extension through the additive structure.

A third aspect of the disclosure provides an additive structure for an airfoil body. At least one air channel is enclosed within the airfoil body and the at least one air channel extends from a root connector to a build surface on the airfoil body. The additive structure includes an extension body extending from the build surface of the airfoil body. The additive structure defines at least one additive air channel extending from the build surface to an external surface of the additive structure. The at least one additive air channel aligns with the at least one air channel in the airfoil body. An outboard tip is formed continuously with the extension body at a distal end opposite the build surface on the airfoil body.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
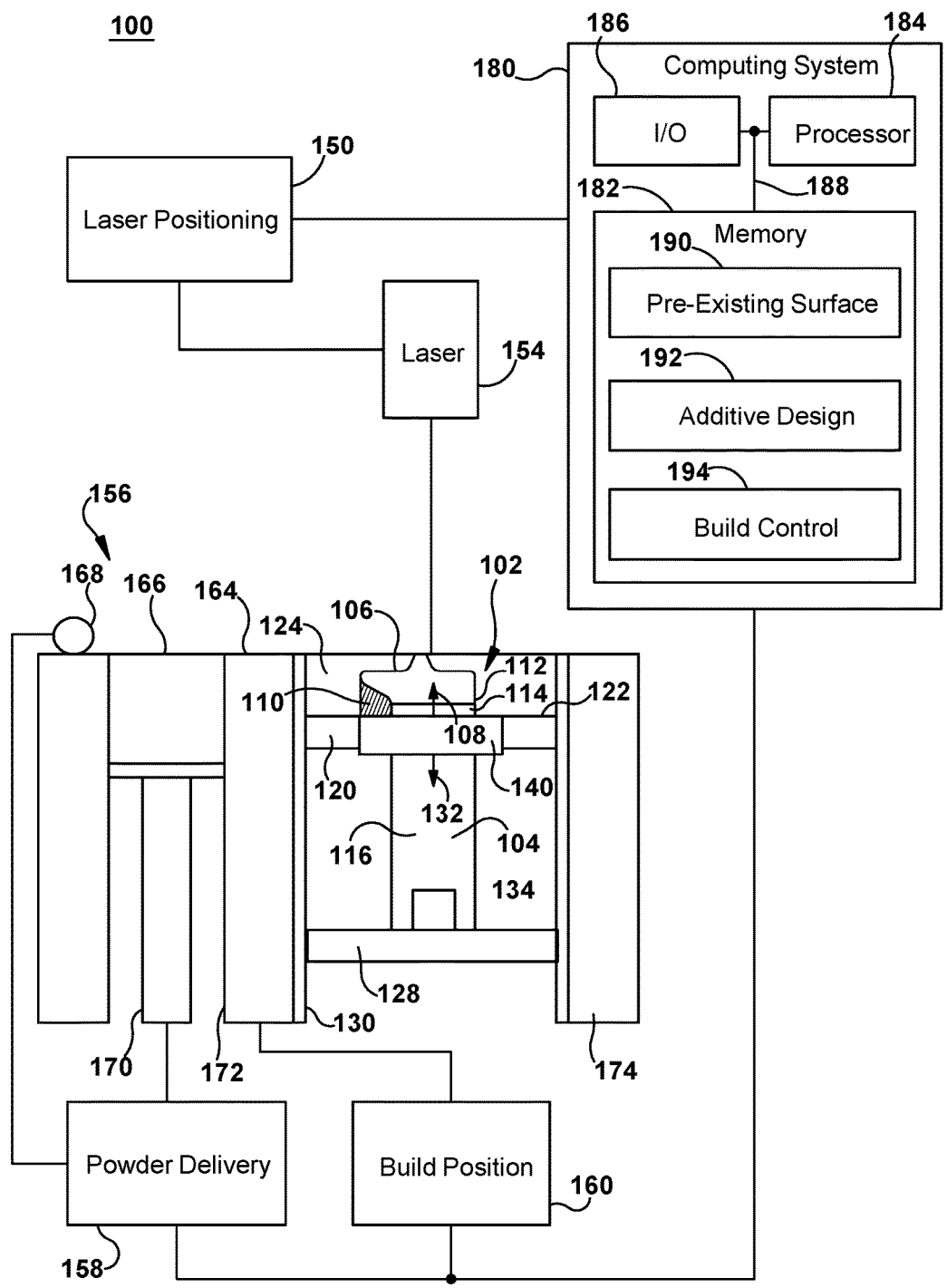
FIG. 1 shows a diagram of an example system for additive manufacturing according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, an example system 100 for additive manufacturing of a hybrid component 102, such as a rotor blade, including a pre-existing component 104 and an additive component 106, is depicted. Pre-existing component 104 and additive component 106 may have one or more internal features, such as air channels, that may be aligned during additive manufacture to extend the internal features from pre-existing component 104 into additive component 106. Component 102 may form part of, or may be adaptable to form part of, a larger component and/or machine, such as a power generation assembly. It will be understood, however, that component 102 may have applications other than those described by example herein. Component 102 may have a build direction 108 coincident with the Z axis describing the direction in which materials are added to form the desired structure. In additive manufacture, a "build direction" of one or more components may be defined by a fabricator before raw materials are processed from raw materials into a desired structure. A build direction for a given component and/or sub-component therefore defines the order in which structural features are formed over time as raw materials (e.g., metallic powders) are fused (sintered or melted) to form a structure. Such materials can include, e.g., one or more pure metals and/or alloys including without limitation: Copper (Cu), Chromium (Cr), Titanium (Ti), Nickel (Ni), aluminum (Al), etc. In an example embodiment, the build direction 108 of component 102 can be oriented along one axis, and perpendicular to the plane of X and Y axis, and generally can be defined to assist in describing the three dimensional structure of the component, as well as the way in which it is formed. Component 102 may include one or more additive supports 110 manufactured with component 102 to be removed prior to use, assembly, or further manufacturing of component 102.

In some embodiments, component 102 may by created by additively manufacturing additive component 106 on a component build surface 112 of pre-existing component 104. For example, pre-existing component 104 may be positioned in and through build plate 120. Build plate 120 may have a plate build surface 122 and a build portion 114 may protrude from plate build surface 122 into build chamber 124 to expose one or more build surfaces, such as component build surface 112. In some embodiments, pre-existing component 104 may have a component body 116 of sufficient size to extend through build plate 120. For example, component body 116 may extend through and away from build plate 120 in a direction opposite build direction 108. In some embodiments, pre-existing component 104 may benefit from additional positioning support in addition to build plate 120. For example, component body 116 may be engaged and be supported by a support plate 128. Support plate 128 and build plate 120 may be maintained with a fixed distance between them to assist in maintaining the position of component 102 during additive manufacturing processes. In some embodiments, support plate 128 and build plate 120 are mounted to a common positioning elevator 130 for moving component 102 in a working direction 132 opposite build direction 108. For example, support plate 128 and build plate 120 may incorporate mounting features for removably engaging positioning elevator 130. Mounting features may include rails and complementary slots, tongue and groove, flanges, support members, and other mating features, with or without removable fasteners for attaching each of support plate 128 and build plate 120 to positioning elevator 130. Support plate 128 may include a base receptacle 134, such as a custom recess for receiving a distal portion of component body 116, with or without mechanical fasteners for securing component body 116 in base receptacle 134. In some embodiments, a base clamp is incorporated into base receptacle 134. In some embodiments, build plate 120 may include a removable fixture 140 for positioning and securing pre-existing component 104 in build plate 120. Removable fixture 140 may include a fixture body inserted into complementary fixture mounting opening in build plate 120. Pre-existing component 104 may be inserted through a component mounting opening in removable fixture 140.

Additive component 106 may be built from successive layers of powdered materials that are fused to one another and the preceding fused layers of additive component 106. The initial layer of additive component 106 may be built on component build surface 112, plate build surface 122, or a combination thereof. Additive component 106 may initially exist solely as a 3D model or other computer-based instructions for building additive component 106 and stored in a computing system 180. These instructions may be provided to additive manufacturing system 100 including a laser positioning system 150, laser 154, and build stage 156. Build stage 156 may include powder delivery system 158 and build positioning system 160. In some embodiments, laser positioning system 152, powder delivery system 158, and build positioning system 160 may be controlled by computing system 150. Successive layers of unfused powdered materials may be positioned by powder delivery system 158 and laser positioning system 150 may control laser 154 to selectively and controllably fuse the powdered material at desired positions, leaving the remaining powdered material in that layer unfused. In some embodiments, laser positioning system 150 may move laser 154 in a generally X-Y coordinate system and control the timing and duration of laser 154 for selectively sintering powdered materials corresponding to that slice of the desired component shape, as well as any necessary supports, such as additive supports 110. Build stage 156 may include a powder bed 164 with a top surface of powdered materials that provide the working layer for laser 154. In some embodiments, build stage 156 may include a powder hopper 166 for holding powdered materials prior to positioning or distribution across powder bed 164 and distributor 168 for positioning the powdered materials in an even layer in powder bed 164. In the example shown, powder hopper 166 may be a powder well with a delivery piston 170 for pushing a desired volume of powdered materials into powder bed 164 for building each layer of additive component 106. Distributor 168 may be a mechanical distributor, such as a roller, rake, brush, or sweep arm, that drags and levels powdered materials from powder hopper 166 across powder bed 164. In embodiments with a fixed powder bed, build positioning system 160 may include a recessed build chamber 124 with a moving build plate 120 that retracts from powder bed 164 as successive layers are added to component 102. Build plate 120 may be supported by positioning elevator 130 and move in a working direction 132 that is opposite build direction 108. Build plate 120 may provide a plate build surface 122 that supports a portion of additive component 106, where at least a portion of the first layer of additive component 106 or additive supports 110 may be fused in contact with plate build surface 122 and any portion of additive component 106 in contact with build plate 120 may be removed from build surface 122 when the build is complete. Build chamber 124 thereby gets deeper to accommodate the completed portion of component 102 as the build progresses. Build chamber 124 may be defined as the space between sidewalls 172, 174 from powder bed 164 to the maximum depth of build plate 120 in its deepest working position. Build chamber 124 may include additional sidewalls perpendicular to sidewalls 172, 174 and laterally enclosing build chamber 124. System 100 is described herein with regard to direct metal laser melting (DMLM) in a powder bed additive manufacturing system modality. It is understood that the general teachings of the disclosure are equally applicable to other modalities of additive manufacturing now existing or developed in the future.

In some embodiments, computing system 180 may provide a plurality of programmatic controls and user interface for operating and coordinating laser positioning system 150, powder delivery system 158, and build positioning system 160 before, during, and after the build process for additive component 106. In some embodiments, computing system 150 is a general purpose computing devices, such as a personal computer, work station, mobile device, or an embedded system in an industrial control system (using general purpose computing components and operating systems). In some embodiments, computing system 180 may be a specialized data processing system for the task of controlling operation of system 100. Computing system 180 may include at least one memory 182, processor 184, and input/output (I/O) interface 186 interconnected by a bus 188. Further, computing system 180 may include communication with external I/O device/resources and/or storage systems, including connected system, such as laser positioning system 150, powder delivery system 158, and build positioning system 160, and network resources. In general, processor 184 executes computer program code, such as an additive manufacturing build control program, that is stored in memory 182 and/or a storage system. While executing computer program code, processor 184 can read and/or write data to/from memory 182, storage systems, and I/O devices (through I/O interface 186). Bus 188 provides a communication link between each of the components within computing system 180. I/O devices may comprise any device that enables a user to interact with computing system 180 (e.g., keyboard, pointing device, display, etc.). Computing system 180 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc. In some embodiments, computing system 180 is a laptop computer in communication with laser positioning system 150, powder delivery system 158, and build positioning system 160 via a wired (serial, USB, Ethernet, etc.) or wireless (802.11, Bluetooth, etc.) connection and running application software for system 100.

In some embodiments, memory 182 of computing system 180 may include one or more application programs, data sources, and/or functional modules for building an additive component structure on an existing component body. In some embodiments, a pre-existing surface module 190 may include a 3D model of component build surface 112 that provides surface location information, including edges, surface features, and/or connecting internal features. For example, pre-existing surface module 190 may include a CAD file describing component build surface 112 and one or more reference locations for laser positioning system 150 to direct an additive build on component build surface 112. In some embodiments, an additive design 192 may include a 3D model of additive component 106 that provides build information for constructing additive component 106 on component build surface 112. For example, additive design 192 may include a CAD file describing additive component 106 (with or without additive supports 144) and material, build layers, and other design information for the additive manufacturing process. In some embodiments, a build control 194 may use information from additive design 192 and/or pre-existing surface 190 to control the additive manufacturing process for additive component 106. For example, build control 194 may direct laser positioning system 150 to fuse each successive layer of powdered materials in accordance with additive design 192 and may also use reference information from pre-existing surface 190 to direct powder delivery system 158 and build positioning system 160.

Figure 2:
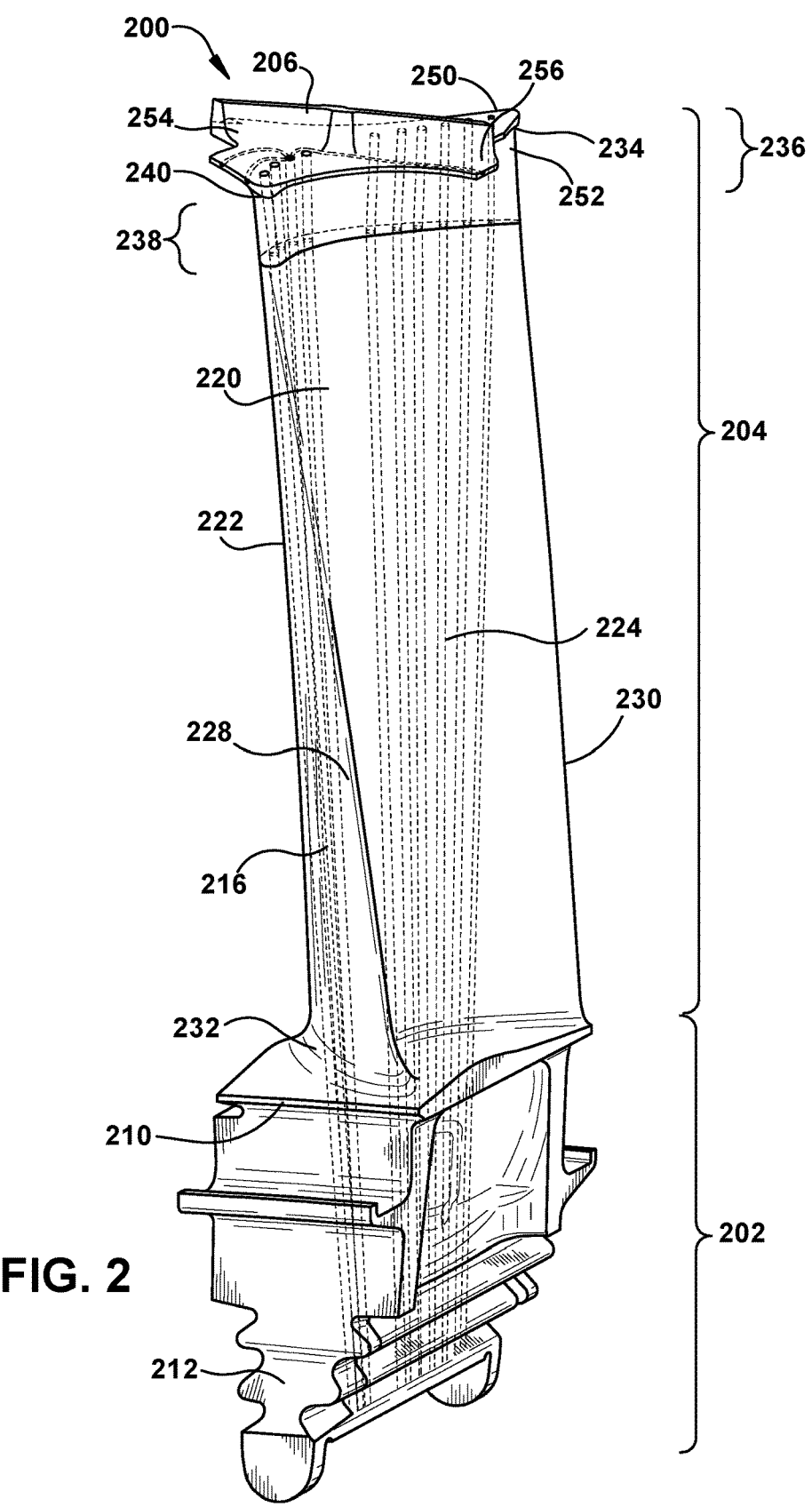
FIG. 2 shows a perspective view of a rotor blade with internal features.
Figure 3:
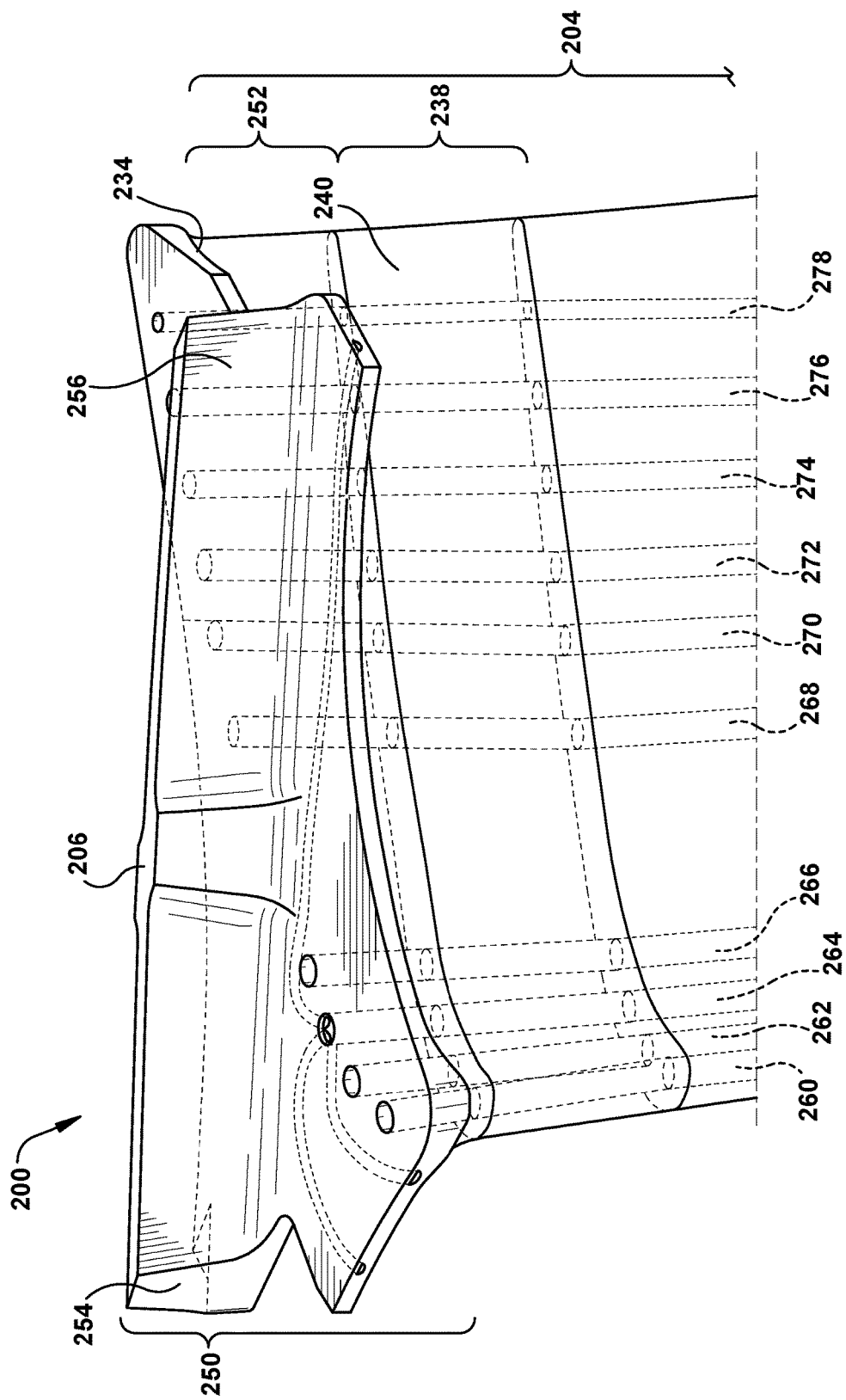
FIG. 3 shows a magnified perspective view of the rotor blade of FIG. 2.

Referring to FIGS. 2 and 3, an example rotor blade 200 made of a pre-existing component and an additive component from an additive manufacturing system, such as system 100 in FIG. 1, is shown. Rotor blade 200 may be comprised of a root or base section 202, an airfoil section 204, and a tip shroud 206. Base section 202 may include a base platform 210 and a root connector 212, such as a dovetail. Root connector 212 may engage a turbine shaft and base platform 210 may engage adjacent rotor blades in the same stage to form a ring around the turbine shaft. Base platform 210 may define one or more chambers or cooling channels for receiving cooling air into one or more internal features of rotor blade 200. Airfoil section 204 may include an airfoil body 220 with an external surface 222 extending around the lateral perimeter of airfoil body 220. External surface 222 may define a pressure side 224, a suction side 226, a leading edge 228, and a trailing edge 230 extending from a base interface 232 to an outboard tip 234. In the example shown, airfoil body 220 may include several areas along a tip portion 236 related to the additive manufacture of the outboard tip 234 and tip shroud 206. A build portion 238 is part of the pre-existing portion of airfoil body 220 that may be exposed above the build plate of an additive manufacturing system and terminate in a component build surface 240. Component build surface 240 may define the transition point between the pre-existing portion of airfoil body 220 manufactured through conventional casting, machining, and/or other manufacturing processes and an additive structure 250 built from component build surface 240. In the example shown, component build surface 240 is a substantially planar surface extending to external surface 222 in the lateral directions. In some embodiments, additive structure 250 may include an additive airfoil body portion 252 extending from component build surface 240 to outboard tip 234. The amount of the additive airfoil body portion 252 relative to the pre-existing portion of airfoil body 220 may depend on individual component design and relative manufacturing considerations between the pre-existing and additive processes. In some embodiments, additive structure 250 may include tip shroud 206, where tip shroud 206 is an extension of additive airfoil body portion 252 from outboard tip 234.

For example, tip shroud 206 and additive airfoil body portion 252 may form a single additive structure created from successive layers of the same material, with or without overlapping features, during a single additive build session. In some embodiments, tip shroud 206 may be a conventional tip shroud design or a more complex tip shroud with detailed features for airflow, cooling, engaging adjacent tip shrouds or other turbine components, etc. In some embodiments, tip shroud 206 may include lateral extensions 254, 256 that extend beyond the adjacent pressure side 224 and suction side 226 surfaces and may engage adjacent tip shrouds. Tip shroud 206 may define external tip shroud surfaces 258 on the exterior of the portion of additive structure 250 defining tip shroud 206.

In some embodiments, rotor blade 200 may include a plurality of internal air channels 260, 262, 264, 266, 268, 270, 272, 274, 276, 278 extending from base section 202, through airfoil body 220, including additive airfoil body portion 252, and to external tip shroud surfaces 258. Air channels 260, 262, 264, 266, 268, 270, 272, 274, 276, 278 may be pre-existing internal features of airfoil body 220 that are extended through additive structure 250. Air channels 260, 262, 264, 266, 268, 270, 272, 274, 276, 278 may include a pre-existing portion within the pre-existing portion of airfoil body 220 and define a plurality of openings in component build surface 240. Air channels 260, 262, 264, 266, 268, 270, 272, 274, 276, 278 may be extended to include a portion through additive airfoil body portion 252 and tip shroud 206. Air channels 260, 262, 264, 266, 268, 270, 272, 274, 276, 278 may define openings in external tip shroud surfaces 258 and/or other external surfaces of additive structure 250 as discharge ports from the respective air channels 260, 262, 264, 266, 268, 270, 272, 274, 276, 278.

Figure 4:
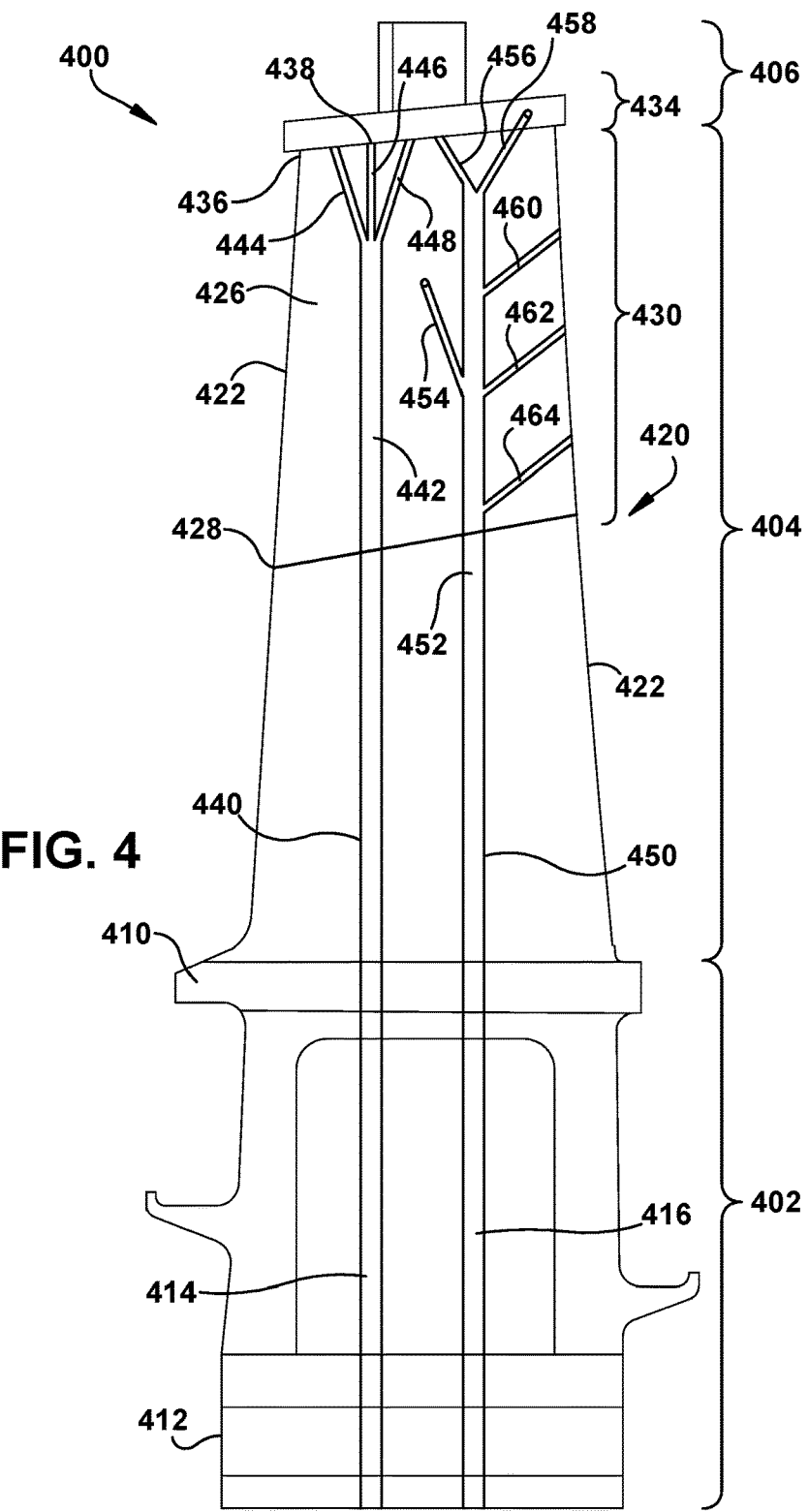
FIG. 4 shows a cross-sectional view of another example rotor blade with internal features.

Referring to FIG. 4, another example rotor blade 400 made of a pre-existing component and an additive component from an additive manufacturing system, such as system 100 in FIG. 1, is shown in a cross-sectional view. Rotor blade 400 may be comprised of a root or base section 402, an airfoil section 404, and a tip shroud 406. Base section 402 may include a base platform 410 and a root connector 412, such as a dovetail. Base platform 410 may define one or more chambers or base air channels 414, 416 for receiving cooling air into one or more internal features of rotor blade 400. Airfoil section 404 may include an airfoil body 420 with an external surface 422 extending around the lateral perimeter of airfoil body 420. Airfoil body 420 may include a pre-existing portion 424 and an additive portion 426 with a component build surface 428 as the transition between pre-existing portion 424 and additive portion 426. In some embodiments, component build surface 428 may be generally parallel to base platform 410 and provide a generally uniform height relative to the build direction for additive portion 426. In some embodiments, component build surface 428 may be angled relative to base platform 410 and the build direction may be adjusted so that it is perpendicular component build surface 428. Additive portion 426 may be an airfoil portion of additive structure 430. Tip shroud 406 may be a tip shroud portion 434 of additive structure 430. In some embodiments, additive structure 430 may extend only to outbound tip 436 and define a tip surface 438. Tip shroud 406 may be a separate component fastened to outbound tip 436, rather than a continuous portion of additive structure 430. Airfoil section 404 includes a plurality of internal features running through pre-existing portion 424 and extended through additive portion 426. Air channels 440, 450 may connect to base air channels 414, 416 and terminate at various external surfaces, including external surface 422 and tip surface 438. In some embodiments, air channels 440, 450 may include trunk channels 442, 452 and branch channels 444, 446, 448, 454, 456, 458, 460, 462, 464. Trunk channels 442, 452 may extend through pre-existing portion 426 to component build surface 428. Trunk channels 442, 452 may continue through additive portion 426 as an internal feature of additive structure 430. Trunk channel 442 splits into branch channels 444, 446, 448 within additive structure 430. Trunk channel 452 splits into branch channels 454, 456, 458, 460, 462, 464. In some embodiments, trunk channels 442, 452 each have a lateral width or diameter and branch channels 444, 446, 448, 454, 456, 458, 460, 462, 464 may each have a lateral width or diameter and the minimum and maximum widths of these channels may vary. For example, the minimum widths of trunk channels 442, 452 may be defined by the process capabilities used to create the pre-existing components and/or prepare component build surface 428. The minimum widths of branch channels 444, 446, 448, 454, 456, 458, 460, 462, 464 may be smaller as enabled by the additive manufacturing process used for additive structure 430. For example, trunk channels may have a minimum width of at least 0.1" or 2.5 millimeters and branch channels may have a minimum width of less than 0.1" or 2.5 mm, for example 0.01" or 0.25 mm. In some embodiments, the network of air channels in additive structure 430 may create substantial air space and reduce the metal material in selected cross-section of additive structure 430 relative to pre-existing portion 424, giving additive structure 430 a lower component density than pre-existing portion 424. In some embodiments, pre-existing portion 424 is comprised of a first metal and additive structure 430 is comprised of a second, different metal with different characteristics. Selection of the first metal and second metal may relate to the process capabilities of the respective manufacturing processes and/or different functional characteristics, including strength, ductility, hardness, heat/stress tolerance, density, and compatibility with mechanical features and/or surface treatments. In some embodiments, additive structure 430 may be made of a weight reduced mechanical structure created through additive manufacturing, such as porous matrix or lattice of metal materials. In some embodiments, pre-existing portion 424 may be a portion of a damaged component, such as a rotor blade, and component build surface 428 is a prepared surface where a damaged feature has been removed. For example, a worn, corroded, or broken outboard tip may be ground down to remove the compromised portion and the resulting surface prepared for an additive build to replace or augment the removed portion.

Figure 5:
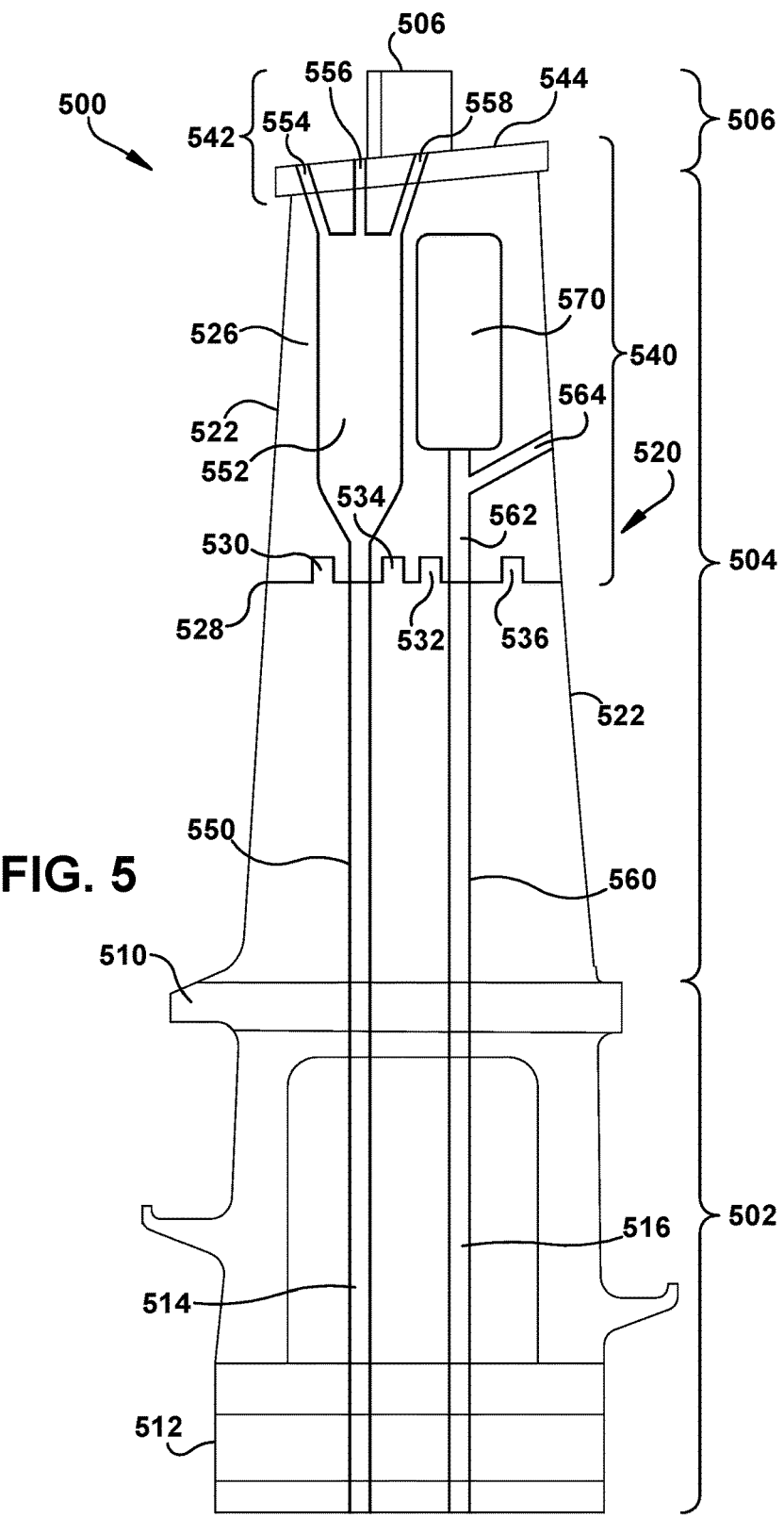
FIG. 5 shows a cross-sectional view of another example rotor blade with internal features.

Referring to FIG. 5, another example rotor blade 500 made of a pre-existing component and an additive component from an additive manufacturing system, such as system 100 in FIG. 1, is shown in a cross-sectional view. Rotor blade 500 may be comprised of a root or base section 502, an airfoil section 504, and a tip shroud 506. Base section 502 may include a base platform 510 and a root connector 512, such as a dovetail. Base platform 510 may define one or more chambers or base air channels 514, 516 for receiving cooling air into one or more internal features of rotor blade 500. Airfoil section 504 may include an airfoil body 520 with an external airfoil surface 522 extending around the lateral perimeter of airfoil body 520. Airfoil body 520 may include a pre-existing portion 524 and an additive portion 526 with a component build surface 528 as the transition between pre-existing portion 524 and additive portion 526. Component build surface 528 may include one or more surface features for assisting with the additive build of additive portion 526 by providing additional build surfaces for fusing the two components. For example, component build surface 528 may include surface extensions 530, 532, 534, 536 providing both distal and lateral contact surfaces for building additive portion 526. Additive portion 526 may be an airfoil portion of additive structure 540. Tip shroud 506 may be a tip shroud portion 542 of additive structure 540 and define an external shroud surface 544. Airfoil section 504 shows a plurality of example internal features in additive portion 526, some of which are continuous with internal features in pre-existing portion 524. Air channels 550, 560 may connect to base air channels 514, 516 and terminate at various external surfaces, including external airfoil surface 522 and external shroud surface 544. Air channel 550 may provide a flow path through pre-existing portion 524 and connect to an air chamber 552 in additive portion 526. A plurality of smaller air channels 554, 556, 558 may provide discharge paths from air chamber 552 through external shroud surface 544. Air channel 560 may provide a flow path into a matching air channel 562 through additive portion 526 to a discharge opening 564 in external airfoil surface 522. Note that it does not connect to chamber 570. In some embodiments, chamber 570 may be an isolated internal feature of additive structure 540 for mass (density) reduction toward the outboard end of rotor blade 500. In some embodiments, chambers 552, 570 in additive structure 540 may create substantial air space and reduce the metal material in a selected cross-section of additive structure 540 relative to pre-existing portion 524, giving additive structure 540 a lower component density than pre-existing portion 524.

Figure 6:
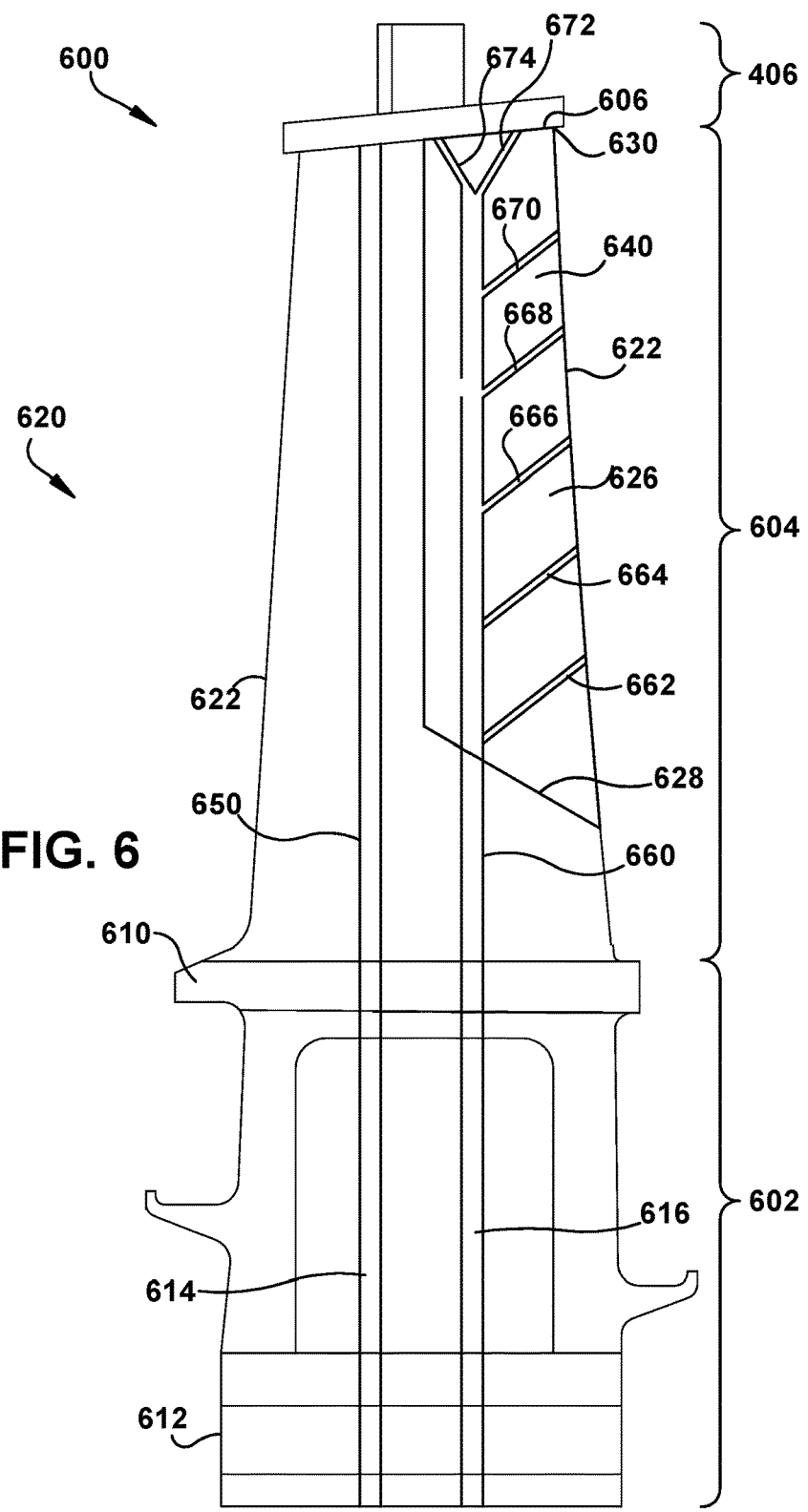
FIG. 6 shows a cross-sectional view of another example rotor blade with internal features.

Referring to FIG. 6, another example rotor blade 600 made of a pre-existing component and an additive component from an additive manufacturing system, such as system 100 in FIG. 1, is shown in a cross-sectional view. Rotor blade 600 may be comprised of a root or base section 602, an airfoil section 604, and a tip shroud 606. Base section 602 may include a base platform 610 and a root connector 612, such as a dovetail. Base platform 610 may define one or more chambers or base air channels 614, 616 for receiving cooling air or other fluids into one or more internal features of rotor blade 600. Airfoil section 604 may include an airfoil body 620 with an external airfoil surface 622 extending around the lateral perimeter of airfoil body 620. Airfoil body 620 may include a pre-existing portion 624 and an additive portion 626 with a component build surface 628 as the transition between pre-existing portion 624 and additive portion 626. In some embodiments, component build surface 628 may be oriented along a radius of rotor blade 600 or parallel to an edge, such as a leading or trailing edge, for additive features clustered along an edge. Additive portion 626 may be an edge additive structure 640. Tip shroud 606 may be a separate component attached to a distal tip surface 630. In some embodiments, distal tip surface 630 is defined by distal portions of pre-existing portion 624 and additive portion 620. Airfoil section 604 shows a plurality of example internal features in additive portion 626, which may be continuous with internal features in pre-existing portion 624. Air channels 650, 660 may connect to base air channels 614, 616 and terminate at various external surfaces, including external airfoil surface 622 and distal tip surface 630. Air channel 650 may provide a flow path entirely through pre-existing portion 624 to a discharge opening in distal tip surface 630. Air channel 660 may flow through both pre-existing portion 624 and additive portion 620. In some embodiments, air channel 660 may be a trunk channel connected to a plurality of smaller branch air channels 662, 664, 666, 668, 670, 672, 674. Branch air channels 662, 664, 666, 668, 670, 672, 674 may provide discharge paths from air channel 660 through external airfoil surface 622 on additive portion 620 and distal tip surface 630.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A rotor blade comprising:
   a root connector configured to engage a turbine shaft of a turbomachine;
   an airfoil extending from the root connector, the airfoil including an airfoil body including an air channel enclosed within the airfoil body and extending to a substantially planar build surface; and
   an additive extension from the build surface of the airfoil body, the additive extension including an additive structure including an air channel extending from the build surface to an external surface of the additive extension,
   wherein the additive structure is disposed directly over, and extends radially away from, the build surface of the airfoil body, and wherein the air channel of the additive structure extends the air channel in the airfoil body from the build surface of the airfoil body to the external surface of the additive extension.

2. The rotor blade of claim 1, wherein the root connector includes an air channel, such that a continuous internal airflow path from the root connector through the airfoil to the external surface of the additive extension is formed by the air channel of the root, the air channel of the airfoil body, and the air channel of the additive structure.

3. The rotor blade of claim 1, wherein the airfoil includes a pressure sidewall and a suction sidewall that define an outer surface and an outboard tip, and wherein the airfoil body terminates in the build surface prior to the outboard tip and the additive extension includes the outboard tip.

4. The rotor blade of claim 3, wherein the additive structure further includes a mounting surface for a tip shroud.

5. The rotor blade of claim 3, wherein the additive extension further includes a tip shroud and the additive structure defines the tip shroud and includes at least a portion of the at least one air channel through the tip shroud.

6. An additive structure for an airfoil body, the airfoil body including an air channel enclosed within the airfoil body and wherein the the air channel extends from a root connector to a substantially planar build surface on the airfoil body, the additive structure comprising:
   an extension body extending from the build surface of the airfoil body and including an additive air channel extending from the build surface to an external surface of the additive structure, the air channel of the extension body aligning with the air channel in the airfoil body; and
   an outboard tip formed continuously with the extension body at a distal end opposite the build surface on the airfoil body.

7. The additive structure of claim 6, further including a mounting surface for a tip shroud on the outboard tip.

8. The additive structure of claim 6, further comprising a tip shroud formed continuously with the outboard tip, wherein the additive air channel extends through the outboard tip and the tip shroud.

\* \* \* \* \*